United States Patent [19]

Gray et al.

[11] Patent Number: 4,954,821
[45] Date of Patent: Sep. 4, 1990

[54] METHOD OF ESTABLISHING TRANSMISSION GROUP NUMBERS FOR NETWORK LINKS

[75] Inventors: James P. Gray, Chapel Hill; Jeffrey G. Knauth, Raleigh; Diane P. Pozefsky, Chapel Hill; Lee M. Rafalow, Durham, all of N.C.

[73] Assignee: International Business Machines Corporation, Armonk, N.Y.

[21] Appl. No.: 168,286

[22] Filed: Mar. 15, 1988

[51] Int. Cl.$^5$ ............................................. H04Q 1/00
[52] U.S. Cl. ........................ 340/825.52; 340/825.50;
     340/825.07; 370/85.1; 370/94.1
[58] Field of Search ................. 340/825.52, 825.05,
     340/825.07, 825.5; 370/85, 86, 94, 95

[56] References Cited

U.S. PATENT DOCUMENTS

| | | | |
|---|---|---|---|
| 4,706,082 | 11/1987 | Miesterfield et al. | 340/825.50 |
| 4,736,363 | 4/1988 | Aubin et al. | 370/94 |
| 4,771,424 | 9/1988 | Suzuki et al. | 370/86 |
| 4,779,092 | 10/1988 | Takao | 340/825.50 |
| 4,785,396 | 11/1988 | Murphy et al. | 340/825.50 |
| 4,785,449 | 11/1988 | Nakamura et al. | 370/85 |
| 4,786,899 | 11/1988 | Berner et al. | 340/825.50 |

*Primary Examiner*—Palmer C. DeMeo
*Assistant Examiner*—Brian Palladine
*Attorney, Agent, or Firm*—Gerald R. Woods

[57] ABSTRACT

The invention enables two nodes in a communications network to dynamically establish the transmission group number used to partially identify a given link between the nodes. When the link is being activated, both nodes simultaneously propose either a zero or a non-zero number to each other in an exchange of exchange identification (XID) messages. If only one of the nodes proposed a non-zero number, that non-zero number is selected as the transmission group number. If both nodes had proposed zero or both had proposed non-zero numbers, predetermined criteria are employed to select a controlling node. The controlling node chooses the final transmission group number and communicates that choice to the non-controlling node.

5 Claims, 5 Drawing Sheets

METHOD OF ESTABLISHING TRANSMISSION GROUP NUMBERS FOR NETWORK LINKS

BACKGROUND OF THE INVENTION

The present invention relates to communication networks and more particularly to a method for permitting two partner nodes to dynamically establish a transmission group number for identifying a link between the two nodes.

For purposes of the following description, a communications network can be defined as a collection of network nodes which are interconnected through communications links. A network node can be characterized as a data processing system that provides certain functions within the network, such as routing of messages between itself and its adjacent or neighboring nodes, selection of routes for messages to be transmitted between a network node and a directly-connected end node and the furnishing of directory services to end nodes. The links between nodes may be permanent communications links, such as conventional cable connections, or links that are enabled only when needed, such as dial-up telephone connections.

In establishing a connection between any two nodes, it is necessary that the link between the two nodes be assigned an identifier unique within the entire network. Conventionally, a link is identified by combining network-qualified names for the two nodes with a number assigned to a transmission group connecting the two nodes. A network-qualified node name is a name which is known to be unique in the network. Network-qualified node names are assigned when the system is initially defined or when a node is added to a previously-defined network.

Since the node names are unique within the network, a given link between two nodes is unambiguously identified for each different transmission group number applied to a link between the two nodes. Ambiguity would be created if the same transmission group number were to be applied to two or more parallel links connecting the nodes.

According to the prior art, a transmission group number is assigned to each link between two partner nodes when the system is initially defined or when one or both of the nodes or the link is added to the network.

The requirement that transmission group numbers be assigned at the time of system definition or system reconfiguration adds to the cost and complexity of network operation.

SUMMARY OF THE INVENTION

The present invention eliminates the requirement that transmission group members be assigned during system definition/reconfiguration by allowing two paired or partner nodes to dynamically establish a unique transmission group number for each link between the nodes. The method is performed at each of the two nodes during initialization of a connection. Each node sends an exchange identification message to the remote node. The message includes a proposed non-zero transmission group number if one had been previously defined or a zero transmission group number if no non-zero number has been previously defined. Each node determines the value of the transmission group number contained in the message received from the remote node. If one of the nodes sends a zero while the other node sends a non-zero number, the non-zero number is selected by both nodes. If both nodes send zeros or both send non-zero numbers, each node compares the relative significance of the node names according to predetermined criteria. The node having the more significant node name is selected to assign a final non-zero transmission group number.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the following technical description when read in conjunction with the accompanying drawings, where:

TECHNICAL DESCRIPTION

Figure 1:
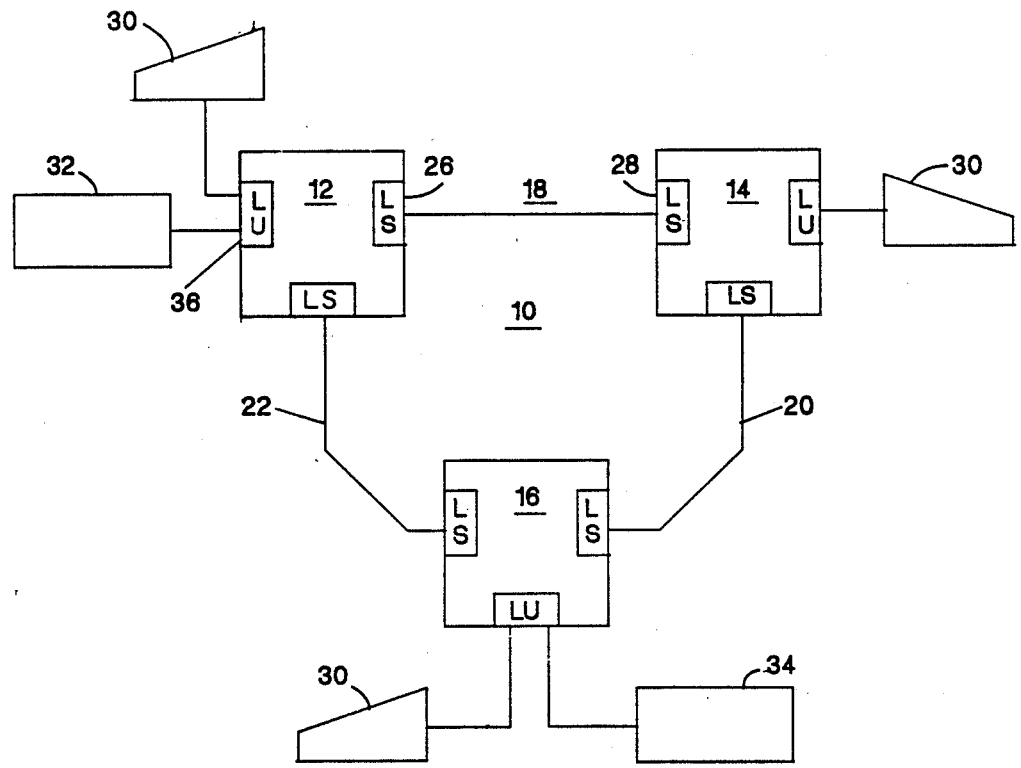
FIG. 1 is a high-level block diagram of a communications network.

Referring to FIG. 1, a simple data communications network 10 is shown as having three nodes 12, 14 and 16, interconnected through links 18, 20 and 22. Referring to link 18 as an example, each link includes a link connection 24 which provides a connection between a first link station 26 in one of the nodes and the second link station 28 in the other of the nodes. The link connection 24 represents the physical medium, such as telephone wire or a microwave beam used to transmit data between the two link stations in the nodes. Expanded definitions of these terms may be found in a number of publications, including Systems Network Architecture Concepts and Products, Order No. GC30-3072, copyright International Business Machines Corporation 1981, 1986; Systems Network Architecture Technical Overview, Order No. GC30-3073, copyright International Business Machines Corporation, 1982, 1986; and Systems Network Architecture Format and Protocol Reference Manual: Architecture Logic for Type 2.1 Nodes, Order No. SC30-3422, copyright International Business Machines Corporation, 1986. While these publications may be of interest to a reader, they are not essential to an understanding of the invention.

The function of the data communications network is to establish and maintain routes or paths which allow two end users to exchange data through the network. An end user may either be an individual at a workstation, such as any of the workstations 30 connected to the different nodes in the network 10, or an application or transaction program, such as program 32 connected to node 12 or program 34 connected to node 16. Each end user is connected to the network through a logical unit or LU which manages the exchange of data. LUs are connected in a mutual relationship called a session. An example of a logical unit or LU is LU 36 in node 12.

The establishment of a connection between two end users at different nodes requires that each link in the route between the end users be unambiguously identified. For example, if an operator at workstation 30 at node 14 wishes to communicate with the application program 32 at node 12, either of two routes can be specified. The more direct route is through link 18 connecting nodes 12 and 14. An indirect route, which might be needed if link 18 were unavailable, is through link 20 connecting nodes 14 and 16 and link 22, connecting nodes 16 and 12. Each of these links must be identified to the two nodes at opposite ends of the link. These two nodes may be referred to hereafter as paired or partner nodes.

The link identifier consists of the names of each of the two partner nodes in combination with the transmission group number, which is a number used to identify what is usually one of several possible link connections between the same two nodes. In the drawings, the term "transmission group number" is abbreviated to TG#. As noted earlier, the prior art practice was to assign, at the time of system definition, a transmission group number to each possible line between two nodes. The present invention improves upon this prior practice by allowing the two partner nodes to dynamically assign a transmission group number as part of the link activation or establishment process.

Figure 2:
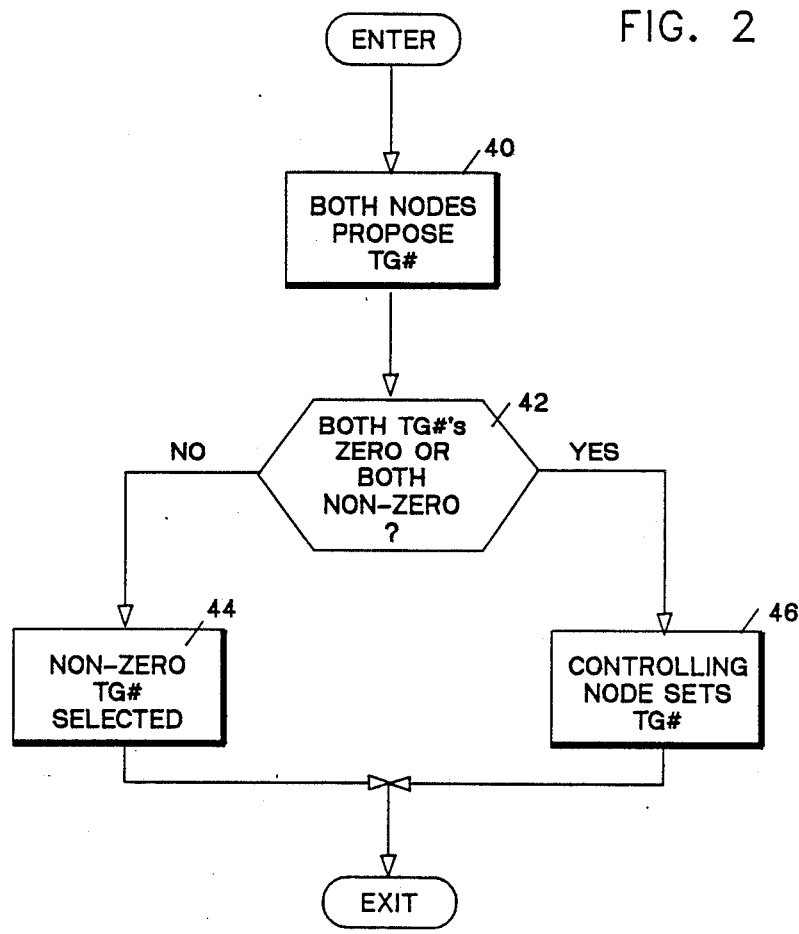
FIG. 2 is a high-level flow chart to be used in providing an initial, brief description of the invention.

FIG. 2 is a short flow chart which provides an overview of the process which allows the nodes to establish a transmission group number. Referring to that figure, each node proposes (block 40) a transmission group number by transmitting an exchange identification (XID) message to the other node. An XID message is used by a given node to convey node and link characteristics to an adjacent node. It is exchanged between link sessions before and during link activation to establish and negotiate link and node characteristics. The format and content of XID messages are described in more detail in the earlier-referenced publications.

The transmission group number proposed by a node may either be a zero or a non-zero number. Conditions under which a node must propose a zero transmission group number or a non-zero transmission group number are explained in more detail later. Each node checks (block 42) to see whether both nodes have proposed either zero transmission group numbers or non-zero transmission group numbers. If only one of the nodes has proposed a zero transmission group number, then both nodes utilize the non-zero transmission group number (block 44), regardless of which node originally proposed it. If, on the other hand, the check in block 42 indicates that both nodes proposed either a zero transmission group number or any non-zero transmission group number, then one of the two nodes must be identified as a controlling node. A preferred mechanism for identifying the controlling nodes is described in more detail later. Once the controlling node is selected, that node selects (block 46) the transmission group number to be used and transmits the selected number to the other or non-controlling node.

Figure 3A:
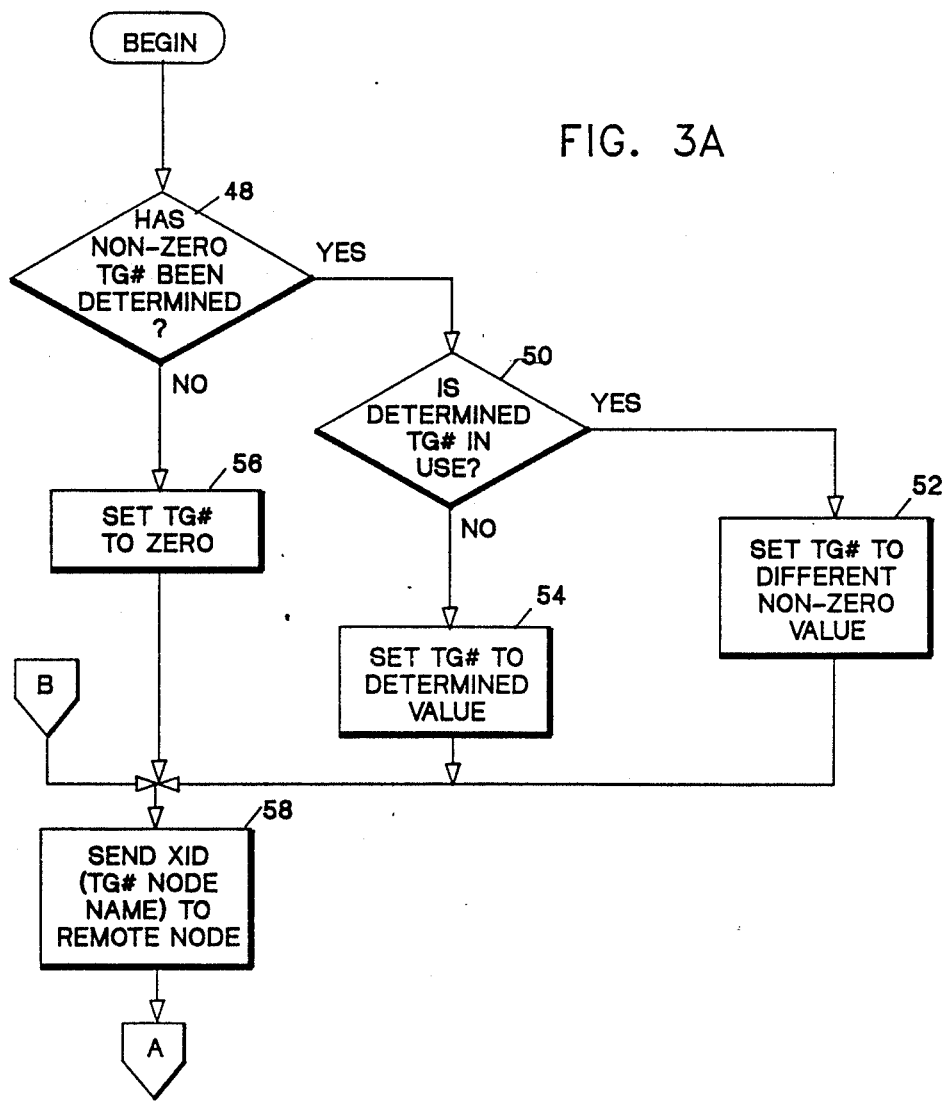
FIG. 3, consisting of FIGS. 3A and 3B, is a more detailed flow chart of a preferred method for dynamically establishing transmission group numbers.
Figure 3B:
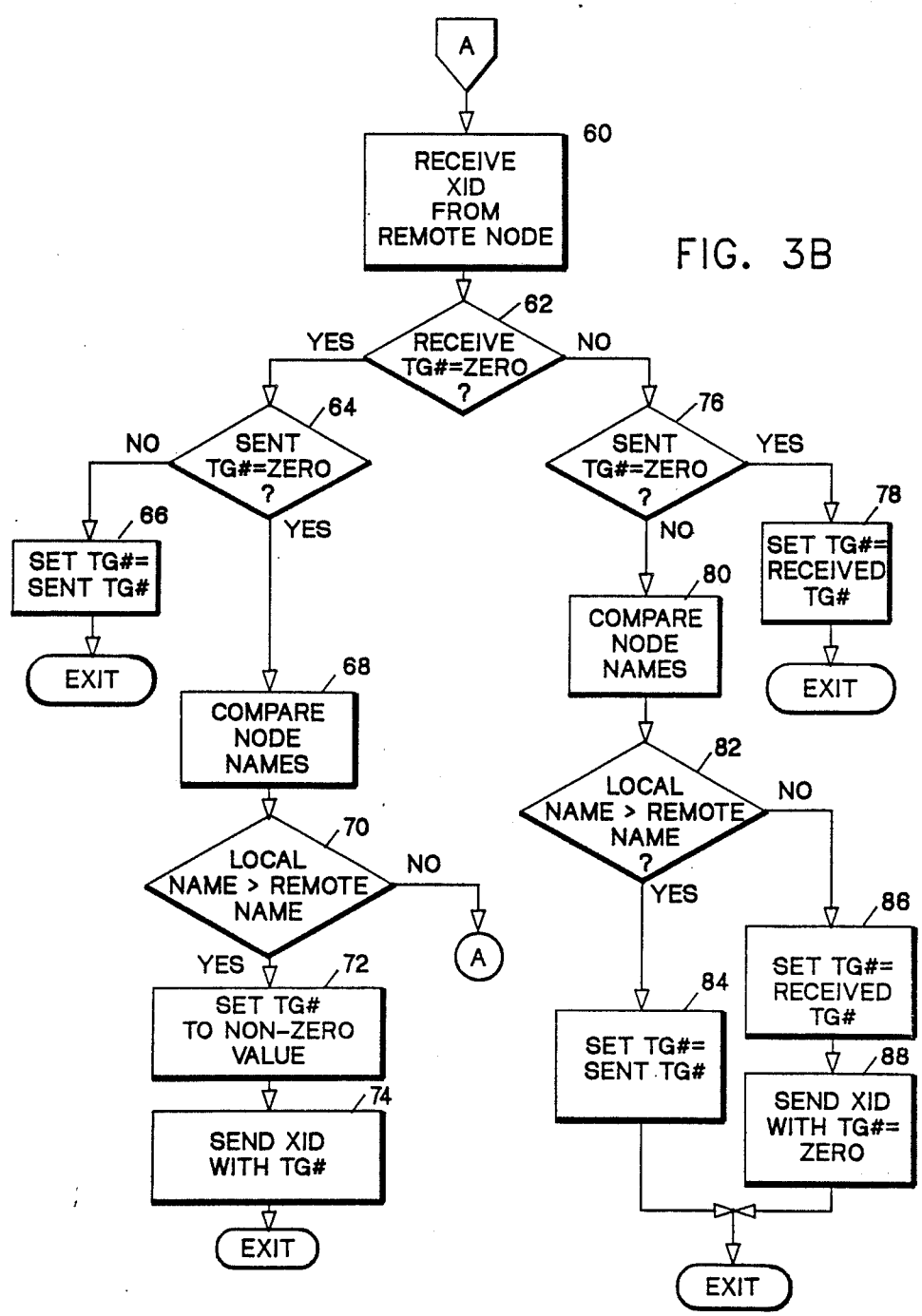

FIG. 3, consisting of FIGS. 3A and 3B taken together, is a more detailed flow chart of the steps performed at each of two partner nodes in order to negotiate a transmission group number acceptable to both. In reviewing the flow chart, it must be kept in mind that each node performs the same series of steps. Where the description refers to a transmission group number being sent, that is the number sent by that node. Obviously, what is a "sent" transmission group number for one node is a "received" transmission group number for the other node.

The first step (block 48) in the process requires that each node see whether a non-zero transmission group number has already been determined (either by definition or by a prior negotiation) for the node pair. If a non-zero number has been determined, a further check (block 50) is made to determine whether that number is already in use. If it is, the node selects a different non-zero value (block 52) from all those values that have not been previously used. If no previously unused values are available, the node selects a value that is currently not being used. If operation 50 had shown the previously determined number is not in use, the proposed transmission group number is set (block 54) to the previously determined value.

If check 48 had shown that no non-zero transmission group number had been previously determined, the node sets the proposed transmission group number equal to zero (block 56).

The proposed transmission group number selected by one of the operations 52, 54 or 56 is sent to the other node (block 58) as part of an exchange of XID messages. As mentioned earlier, the format of XID messages is more fully set forth in the referenced publications.

When a node receives (block 60) the XID message transmitted by the other or remote node, a check (block 62) is made to determine whether the transmission group number proposed by the other node is equal to zero. If the results of check 62 are positive, a further check (block 64) is made to determine whether the transmission group number proposed by the local node is also equal to zero. If the local node had proposed a non-zero number, that non-zero number is selected (block 66) as the final transmission group number. Under those conditions, it is not necessary for the local node to inform the remote node of the selected transmission group number. The remote node will, by performing the operations set forth in FIG. 3, make its own determination that the non-zero transmission group number should be finally selected.

If check 64 indicated that the transmission group number proposed by the local node is zero, meaning that both nodes have proposed zero transmission group numbers, it is necessary to choose a controlling node which will assume the responsibility of selecting a final non-zero transmission group number. The first step in choosing a controlling node is to compare (block 68) the relative value of the network-qualified node names according to some predetermined criteria. Since the network-qualified name for a node is unique within the network, the comparison performed will always show that one of the two nodes has a more "significant" name according to the predetermined criteria. A preferred method of choosing the controlling node will be described later.

Once the comparison is carried out, a check (block 70) is made to determine whether the name of the local node is nore significant than the name of the remote node. If the local name is more significant, the local node chooses (block 72) a final non-zero transmission group number (see block 52). A new XID message is transmitted (block 74) to the remote node with the final transmission group number.

If the check made in block 70 had indicated that the local node name was less significant than the remote node name, the local node, in essence, defers to the remote node since the remote node would assume the responsibility for selecting a final transmission group number and informing the local node of its choice.

If the check at block 62 had indicated that the received transmission group number was not equal to zero, a further check (block 76) is made to determine whether the transmission group number proposed by the local node was equal to zero. If the locally proposed transmission group number was equal to zero, the local node would accept (block 78) the number proposed by the remote node as the final transmission group number before leaving the program.

If the checks made at blocks 62 and 76 had indicated that both nodes had proposed non-zero transmission group numbers, the relative values of the node names are compared (block 80) using the predetermined criteria. If the local node name is found (block 82) to be more significant, the final transmission group number is set to the locally-proposed transmission group number. If decision block 82 showed that the remote node name was more significant, the local node would set the final transmission group number to the transmission group number proposed by the remote node (block 86). The local node would notify the remote node of its acceptance by transmitting a second XID message (block 88) to the remote node with a transmission group number equal to zero.

Note that the initial steps in the process require that the local node check to see whether a zero transmission group number was proposed by the local node the first time a transmission group was activated with a given remote node. If a zero transmission group number had initially been proposed, the local node must continue to propose a zero number each time a link is activated with the same remote node. Conversely, if the local node had proposed a non-zero number when the first transmission group was activated with the given remote node, the local node must continue to propose non-zero numbers during the activation of successive links.

If this practice were not followed, it would be possible for two nodes to negotiate the same number to identify two different links. More specifically, if node 1 proposed a zero number while node 2 proposes a number N (not zero), the process described above will result in the number N being finally selected. If, in setting up a second connection, node 1 were to propose the number N while node 2 proposed zero, the number N would again be selected even if the first connection was still active. Clearly, it is not acceptable to have two different links identified by the same transmission group number. The unacceptable result is avoided by requiring that each node continue to propose the same type of number (either zero or non-zero) that it proposed when the first link was activated with the given remote node.

Figure 4:
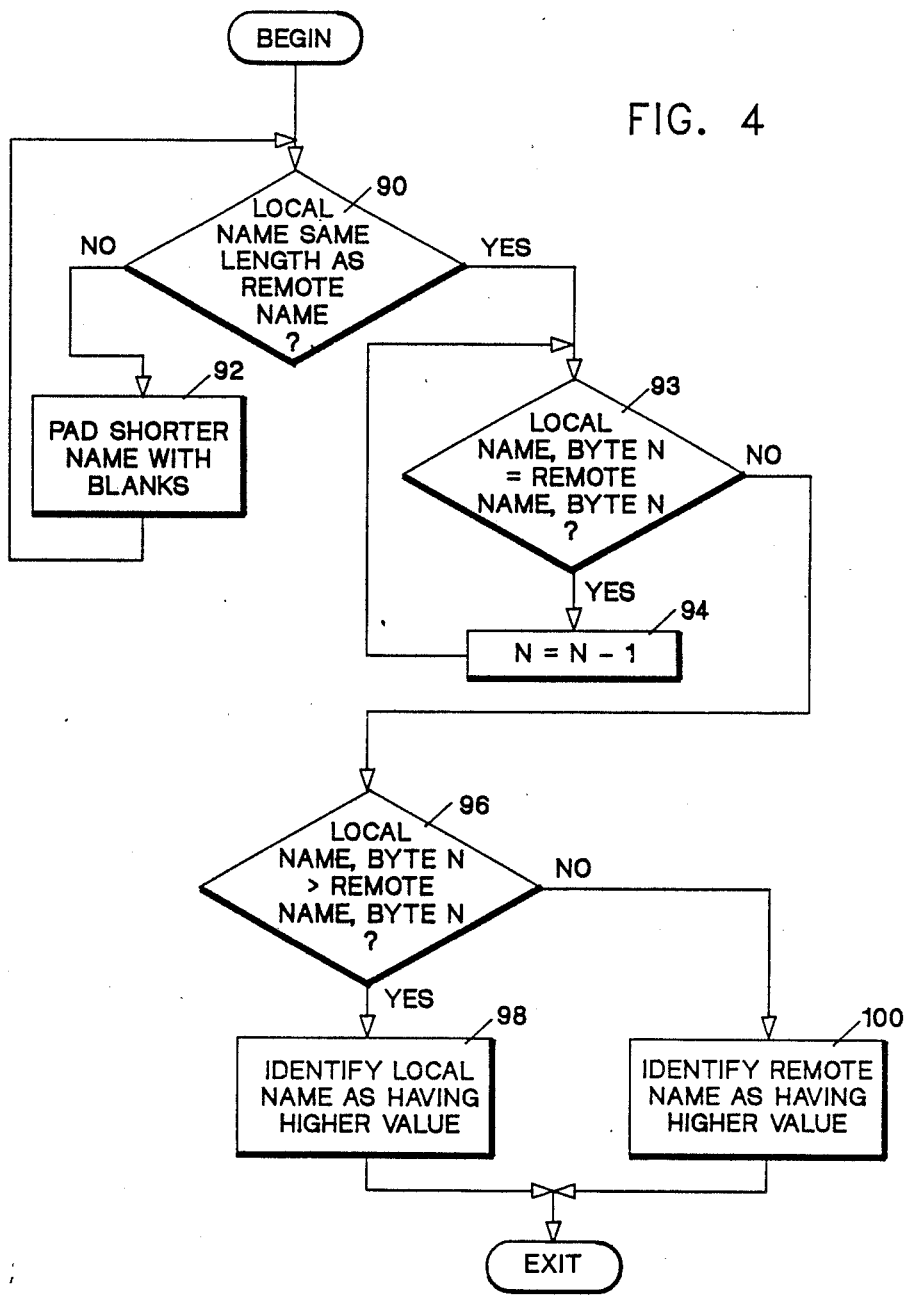
FIG. 4 is a flow chart of a preferred method for establishing the relative significance of network-qualified names of two partner nodes.

While different criteria might be used to determine which node name is more significant, one preferred method will be described with reference to FIG. 4. That method basically uses a standard collating sequence to determine which node name has the greater value in the sequence. The initial step in the process (block 90) is to determine whether both the local node name and the remote node name are the same length. If they are not, the shorter node name is padded with blanks (block 92) until the lengths are equal. Once the name lengths are equal, the names are compared one byte at a time in a loop including operations 93 and 94 until a difference in byte values is detected. A check is then made (block 96) to see whether the byte in the local name has a higher value than the corresponding byte in the remote node name. If the "local" byte has a higher value in the collating sequence than the "remote" byte, the local node becomes the controlling node (block 98) for purposes of finally selecting a transmission group number.

If check 96 had shown that a given byte in the remote node name was more significant than the corresponding byte in the local node name, the remote node would have been selected (block 100) as the controlling node for purposes of establishing a final transmission group number.

While there has been described what is considered to be a preferred embodiment of the present invention, variations and modifications therein will occur to those skilled in the art once they are made aware of the basic concepts of the invention. Therefore, it is intended that the appended claims shall be construed to include not only the preferred embodiment, but all such variations and modifications as fall within the true spirit and scope of the invention.

We claim:

1. In a communications network wherein selected pairs of nodes may be selectively, directly connected by transmission groups, each transmission group being uniquely identified as a function of the names of the paired nodes in combination with an assigned transmission group number, a method for allowing one of the nodes to assign the transmission group number, said method being performed at each of the two nodes during initialization of the connection and comprising the steps of:

sending an exchange identification message from a first node to a second node, said message including a proposed non-zero transmission group number if one had been previously determined at the first node or a zero transmission group number if no non-zero transmission group number had been previously determined;

determining at the first node the value of the transmission group number contained in an exchange identification message received from the second node;

setting the final transmission group number equal to the proposed non-zero transmission group number sent by one of the first and second nodes where the other of the nodes originally sent a zero transmission group number;

comparing the relative significance of the first and second node names according to predetermined criteria where both nodes send either zero transmission group numbers or proposed non-zero transmission group numbers;

selecting the node having the more significant node name according to the predetermined criteria;

causing the selected node to assign a final non-zero transmission group number where both nodes originally sent zero transmission group numbers or where both nodes originally sent proposed non-zero transmission group numbers.

2. A method as defined in claim 1 wherein the step of sending an exchange identification message is preceded by the steps of:

determining whether a proposed non-zero transmission group number is already in use between the first and second nodes; and selecting a different proposed non-zero transmission group number if the originally proposed number is determined to be in use.

3. A method defined in either of claims 1 or 2 including the additional step of having the non-selected node acknowledge its acceptance of the final non-zero transmission group number by sending the selected transmission group number to the selected node.

4. A method as defined in claim 1 wherein said selecting step comprises the steps of:
   comparing the names of the paired nodes to determine the relative values of the names in a standard collating sequence; and
   selecting the node having the name of higher value.

5. A method as defined in claim 1 wherein the step of sending an exchange identification message by a first node is preceded by the steps of:
   determining whether a zero transmission group number had been transmitted to the second node the first time a connection between the two nodes was initiated; and
   sending a non-zero transmission group number only if a zero transmission group number had not been transmitted to the second node at the first connection initiation.

* * * * *